(12) United States Patent
Usuda et al.

(10) Patent No.: US 7,817,598 B2
(45) Date of Patent: Oct. 19, 2010

(54) TRANSMISSION RATE CONTROL METHOD, MOBILE STATION, AND RADIO BASE STATION

(75) Inventors: Masafumi Usuda, Yokosuka (JP); Anil Umesh, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 558 days.

(21) Appl. No.: 11/391,268

(22) Filed: Mar. 29, 2006

(65) Prior Publication Data

US 2006/0221892 A1 Oct. 5, 2006

(30) Foreign Application Priority Data

Mar. 29, 2005 (JP) .......................... P2005-096543

(51) Int. Cl.
 *H04W 4/00* (2009.01)
(52) U.S. Cl. .................. 370/329; 370/337; 370/347; 455/450; 455/452.2; 455/522; 455/69; 455/67.11
(58) Field of Classification Search .................. 455/69, 455/522, 450–452.2, 67.11; 370/332, 328, 370/329, 347
See application file for complete search history.

(56) References Cited

U.S. PATENT DOCUMENTS

| | | | | |
|---|---|---|---|---|
| 5,839,056 | A * | 11/1998 | Hakkinen ..................... | 455/69 |
| 5,987,019 | A * | 11/1999 | Raith et al. ................... | 370/347 |
| 6,014,550 | A * | 1/2000 | Rikkinen .................... | 455/63.1 |
| 6,661,777 | B1 | 12/2003 | Blanc et al. | |
| 7,701,844 | B2 * | 4/2010 | Terry ......................... | 370/216 |
| 2005/0030953 | A1 * | 2/2005 | Vasudevan et al. ........ | 370/395.4 |
| 2005/0079865 | A1 * | 4/2005 | Ahn et al. .................... | 455/434 |
| 2005/0265301 | A1 * | 12/2005 | Heo et al. .................... | 370/349 |
| 2006/0056355 | A1 * | 3/2006 | Love et al. ................... | 370/332 |
| 2006/0104240 | A1 * | 5/2006 | Sebire et al. ................. | 370/329 |
| 2006/0221892 | A1 * | 10/2006 | Usuda et al. ................. | 370/328 |
| 2006/0274712 | A1 * | 12/2006 | Malladi et al. ............... | 370/345 |

(Continued)

FOREIGN PATENT DOCUMENTS

KR 2000-0062703 10/2000

(Continued)

OTHER PUBLICATIONS

3GPP TS 25.309 v6.1.0 (Dec. 2004): 3rd Generation Partnership Project; Technical Specification Group Radio Access Netwok; FDD Enhanced Uplink; Overall description' Stage 2.

(Continued)

*Primary Examiner*—Sharad Rampuria
(74) *Attorney, Agent, or Firm*—Marvin A. Motsenbocker; Mots Law, PLLC

(57) ABSTRACT

A transmission rate control method for controlling a transmission rate of uplink user data, includes: notifying, at a radio network controller, to a radio base station and a mobile station, an effective period to an Absolute Grant Channel which includes an absolute value for the transmission rate of the uplink user data, transmitting, at the radio network controller, the Absolute Grant Channel per Radio Network Temporary Identity based on the notified effective period; and determining, at the mobile station, the transmission rate of the uplink user data based on the notified effective period, when receiving the Absolute Grant Channel per Radio Network Temporary Identity from the radio base station.

9 Claims, 8 Drawing Sheets

U.S. PATENT DOCUMENTS

| | | | |
|---|---|---|---|
| 2007/0047451 A1* | 3/2007 | Lohr et al. | 370/242 |
| 2007/0049309 A1* | 3/2007 | Pan et al. | 455/509 |
| 2008/0139134 A1* | 6/2008 | Usuda et al. | 455/95 |
| 2009/0225713 A1* | 9/2009 | Hayashi et al. | 370/329 |
| 2010/0111023 A1* | 5/2010 | Pelletier et al. | 370/329 |

FOREIGN PATENT DOCUMENTS

WO  WO 2004/064426 A1  7/2004

OTHER PUBLICATIONS

TSG-RAN WG2 #46/ Scottsdale, AZ, USA, Feb. 14-18, 2005/ Source: Ericsson/ Title: E-DCH Priority Based Scheduling/ Agenda Item: 11.2/ Document for: Discussion and Decision.

Samsung, "EUL Scheduling: signalling support", 3GPP TSG RAN WG1 #38bis, Seoul, Korea, Sep. 20-24, 2004, XP-002375260, Tdoc R1-041084, pp. 1-7.

Qualcomm Europe, "Scheduling for EUL", 3GPP TSG-RAN1 #38, Prague, Czech Republic, Aug. 16-20, 2004, XP-002366791, R1-04-0900, pp. 1-5.

Official Action Letter issued on Jun. 6, 2008 in the counterpart Chinese patent application.

Official Action Letter issued on Jun. 10, 2008 in the counterpart Japanese patent application.

Search Report Issued on Jun. 27, 2006 in the Counterpart European Application.

* cited by examiner

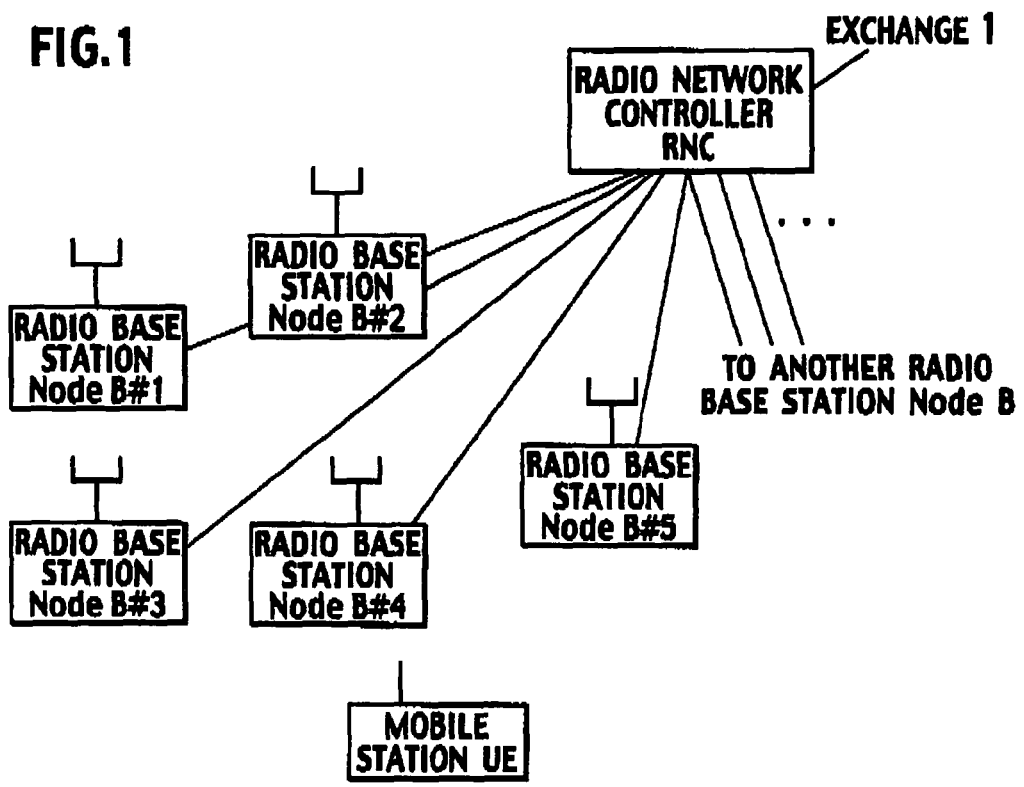
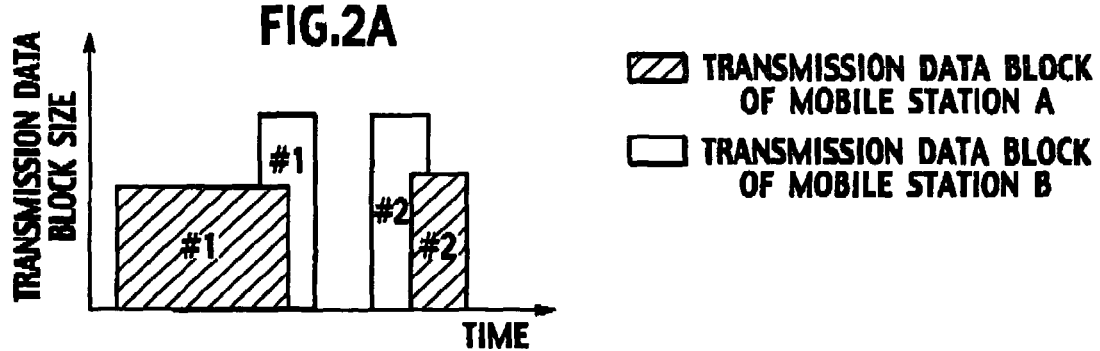
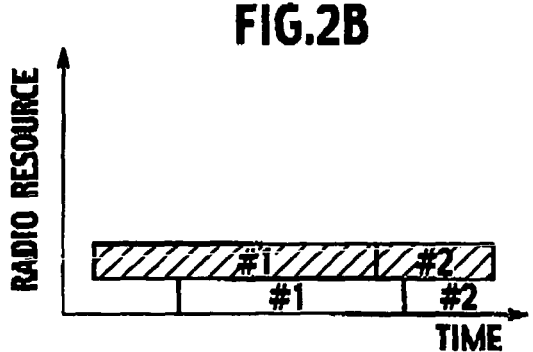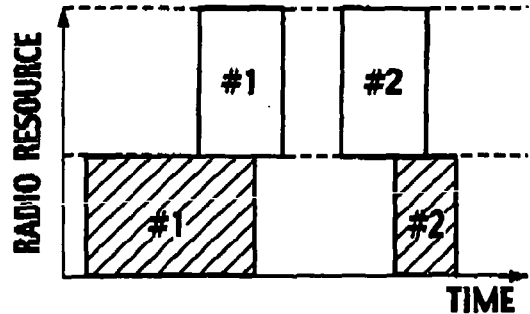

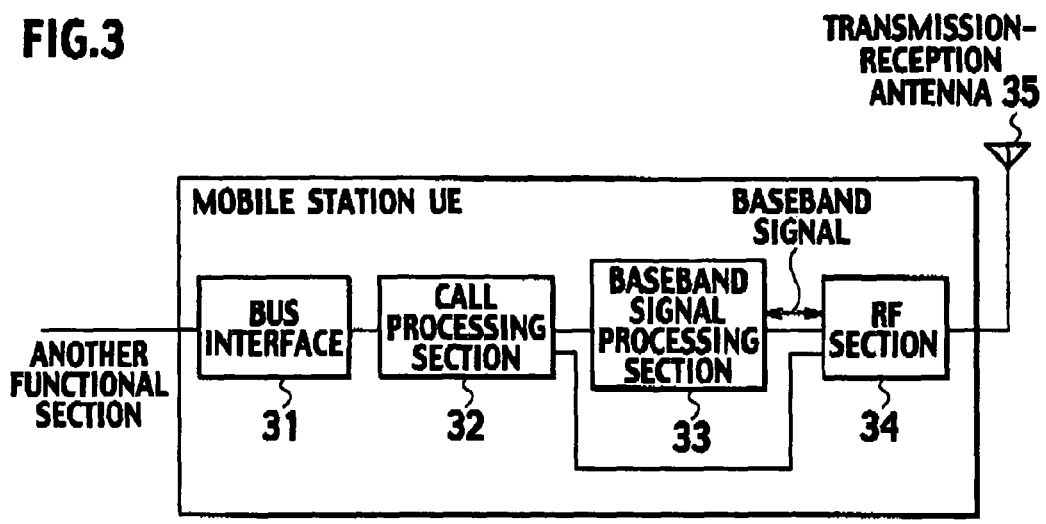
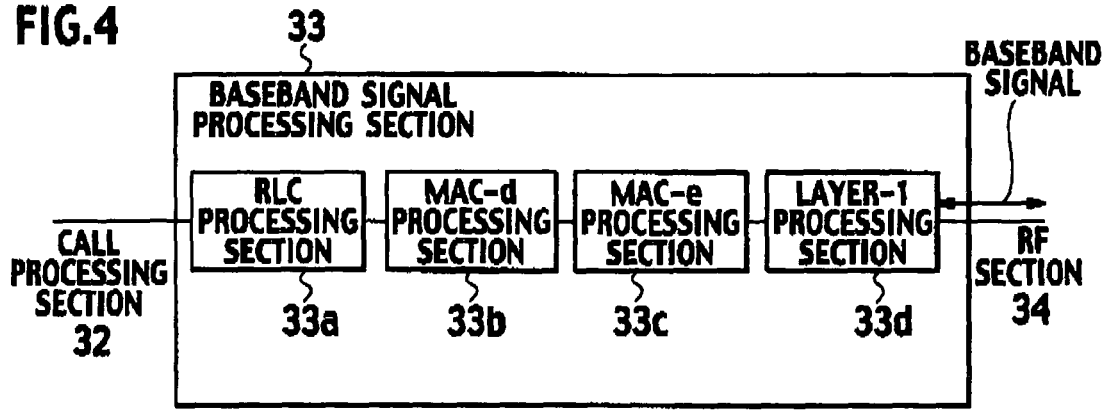
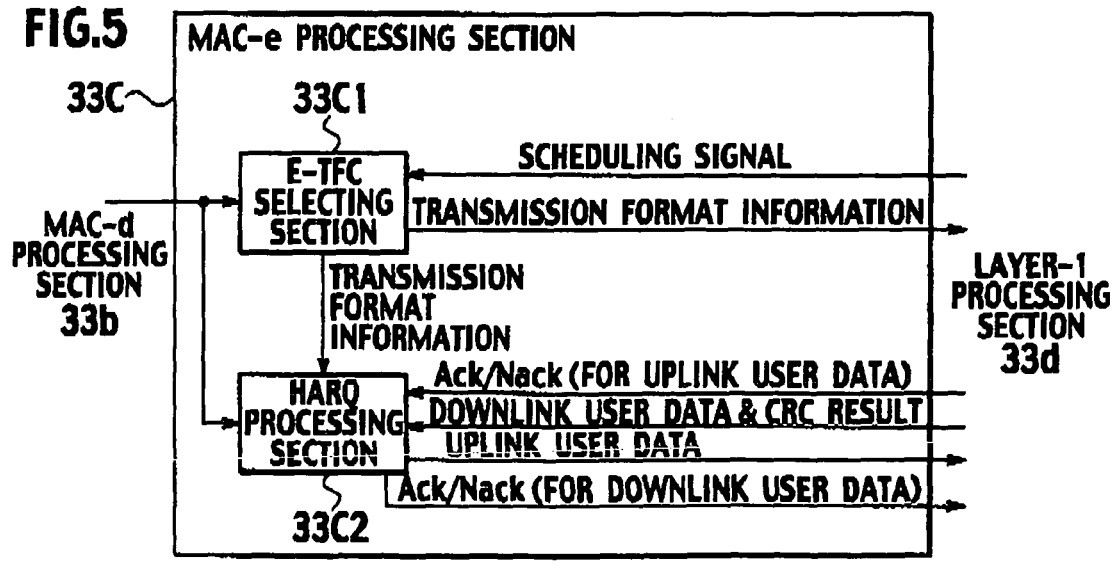

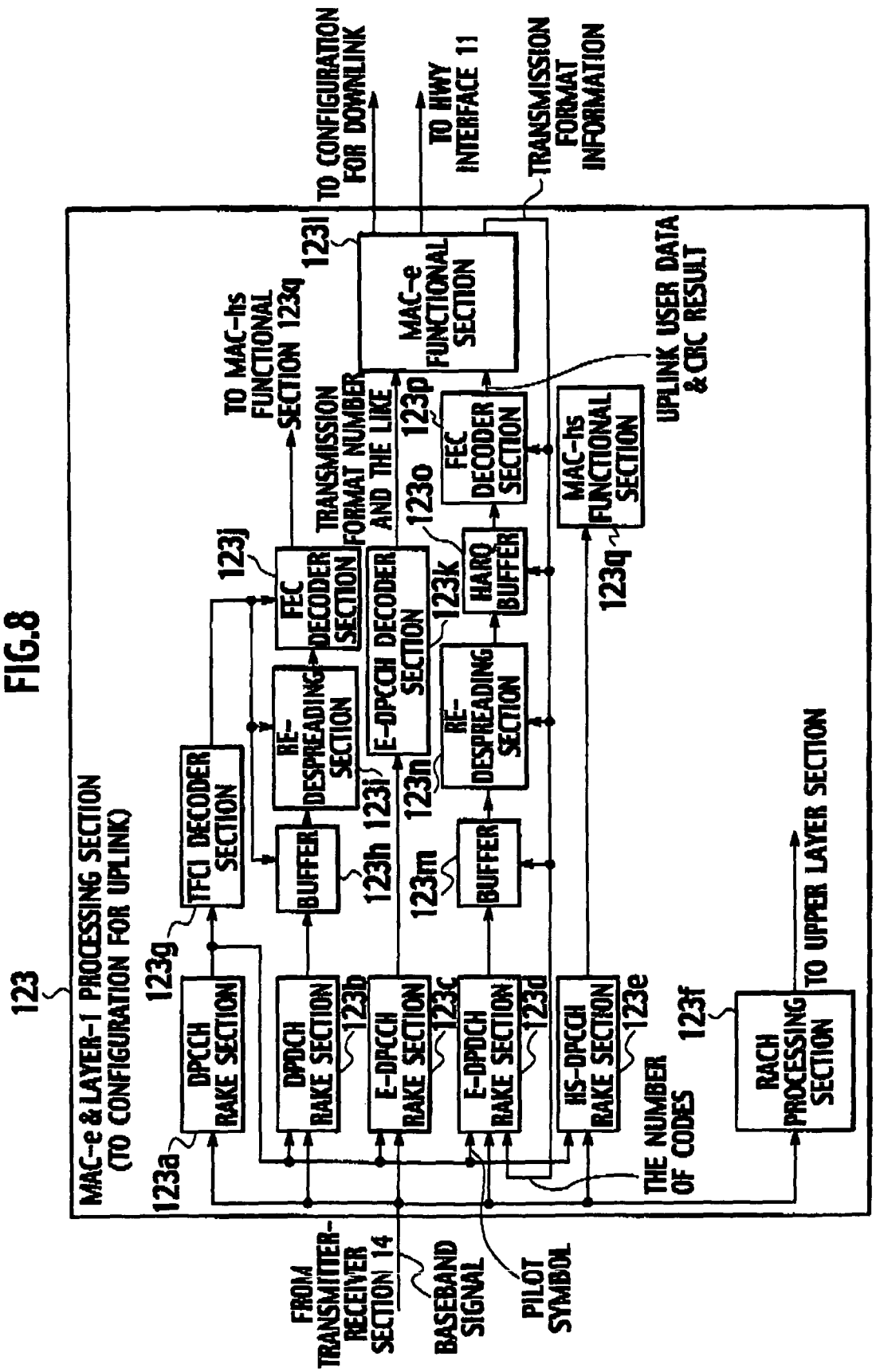

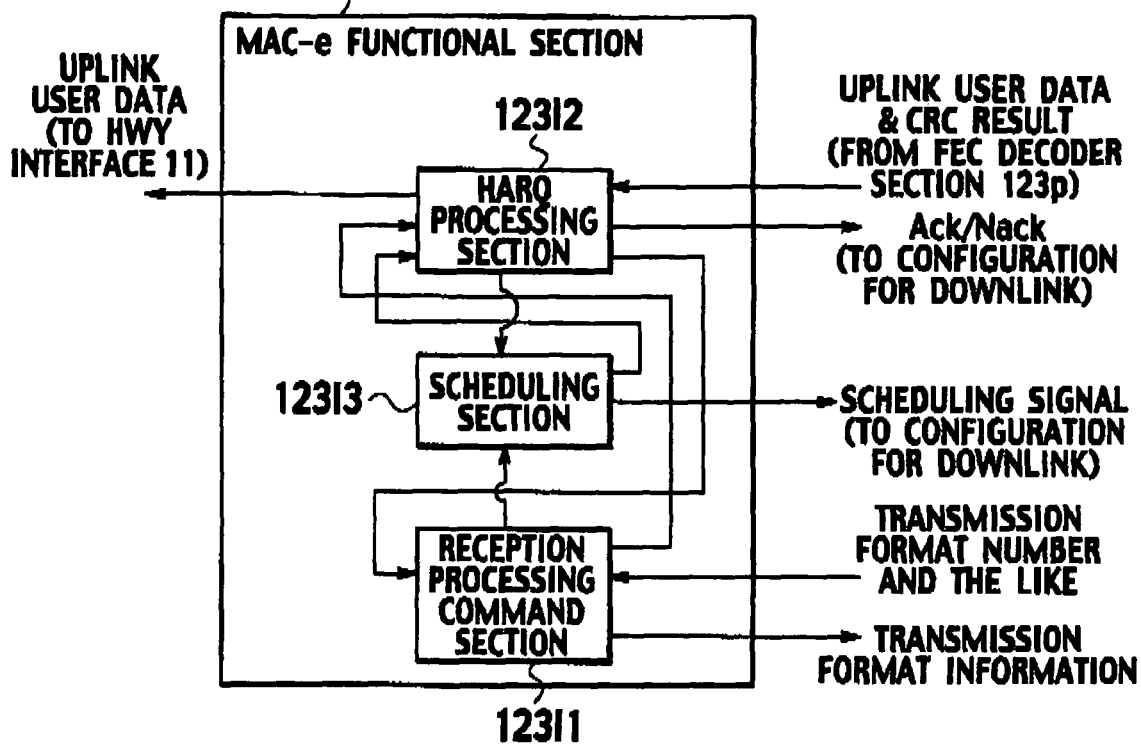
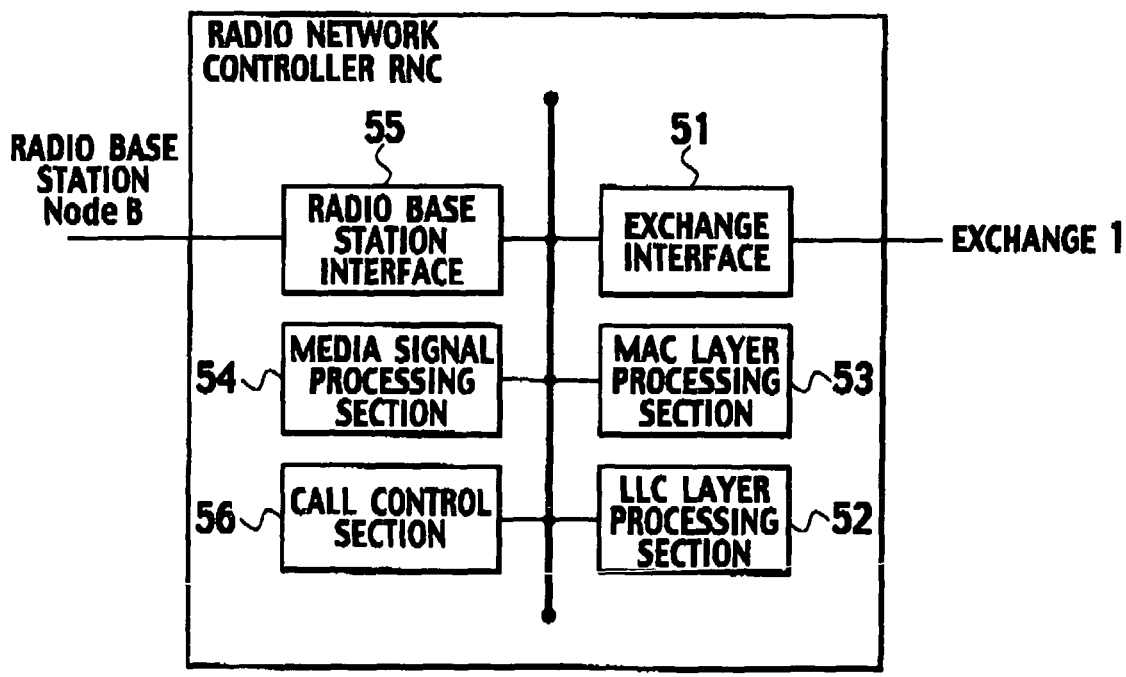

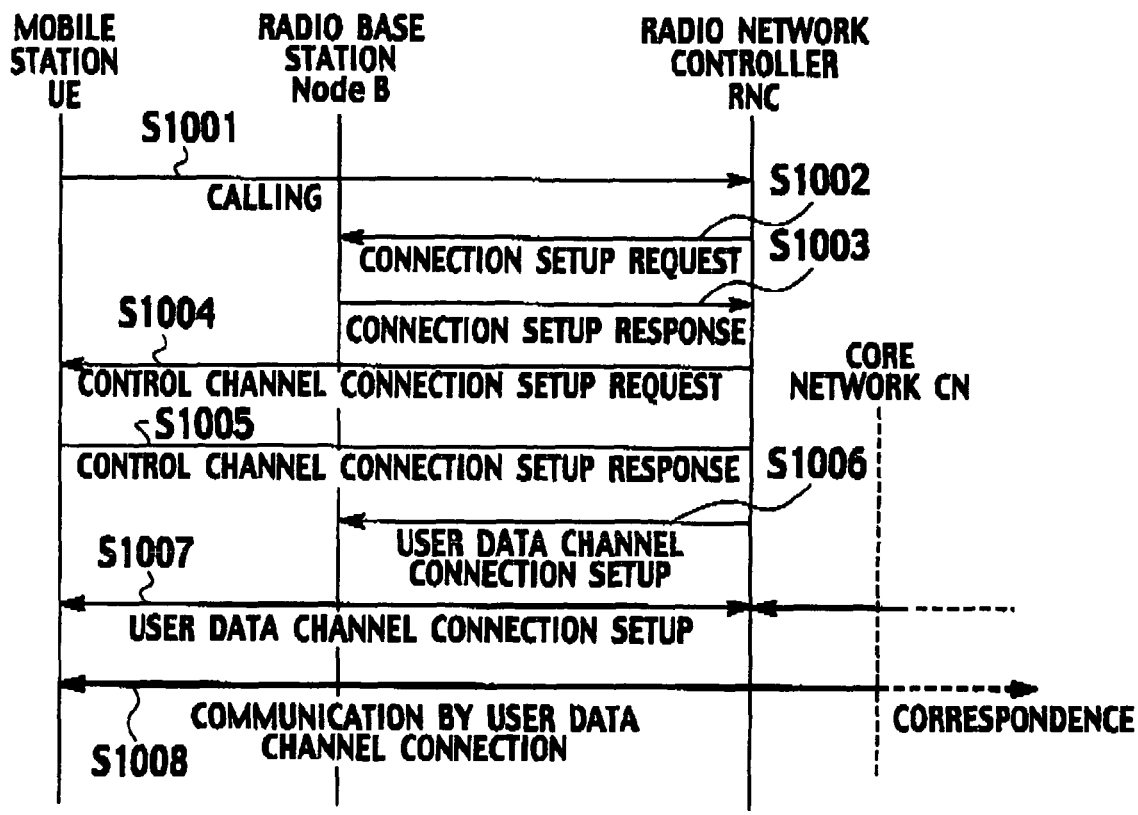

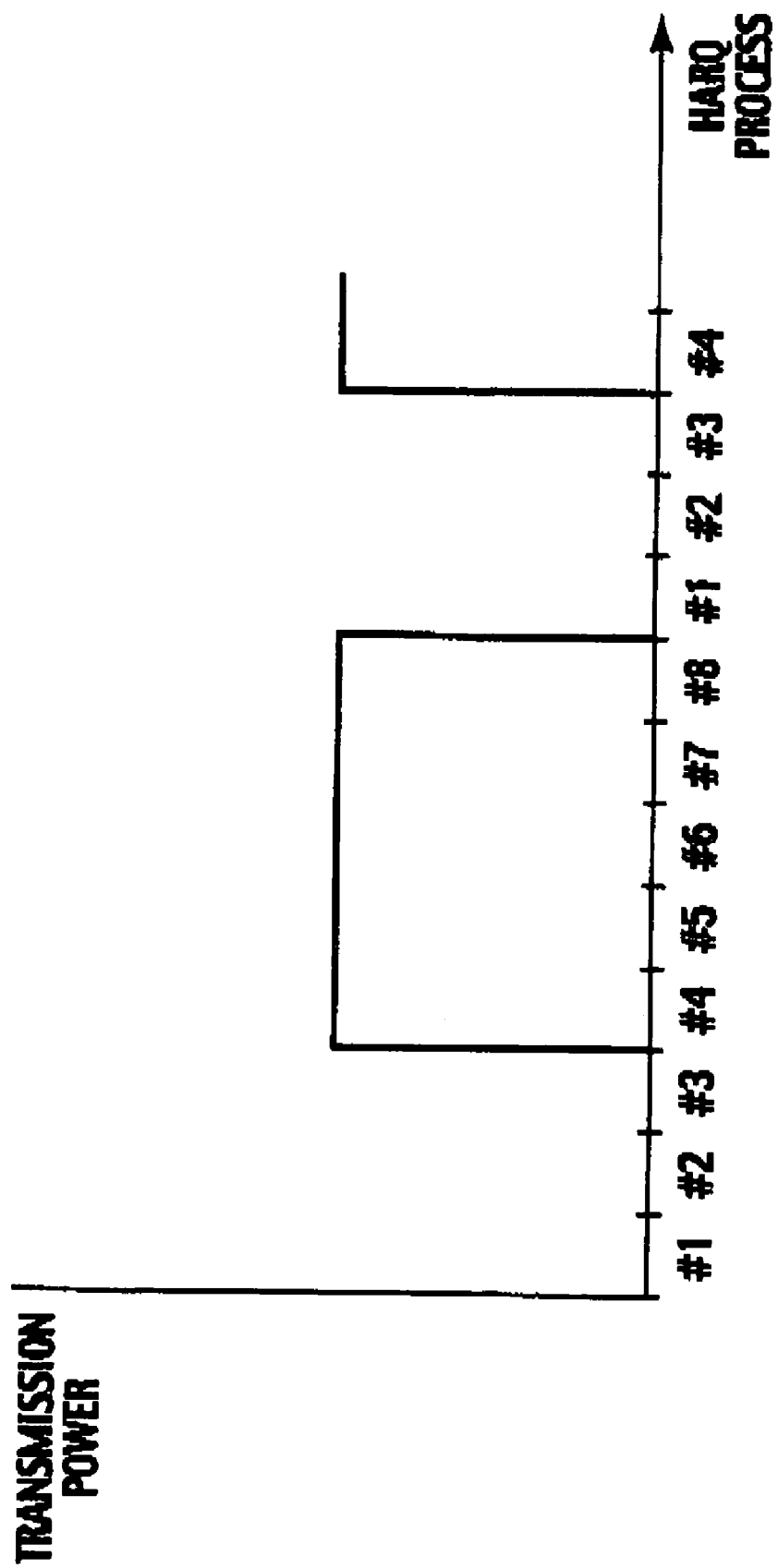

TRANSMISSION RATE CONTROL METHOD, MOBILE STATION, AND RADIO BASE STATION

CROSS REFERENCE TO RELATED APPLICATION

This application is based upon and claims the benefit of priority from the prior Japanese Patent Application No. P2005-096543, filed on Mar. 29, 2005; the entire contents of which are incorporated herein by reference.

BACKGROUND OF THE INVENTION

1. Field of the Invention

The present invention relates to a transmission rate control method for controlling transmission rate of an uplink user data, a mobile station, and a radio base station.

2. Description of the Related Art

In a conventional mobile communication system, in an uplink from a mobile station UE to a radio base station Node B, a radio network controller RNC is configured to determine a transmission rate of a dedicated channel, in consideration of radio resources of the radio base station Node B, an interference volume in an uplink, transmission power of the mobile station UE, transmission processing performance of the mobile station UE, a transmission rate required for an upper application, and the like, and to notify the determined transmission rate of the dedicated channel by a message of a layer-3 (Radio Resource Control Layer) to both of the mobile station UE and the radio base station Node B.

Here, the radio network controller RNC is provided at an upper level of the radio base station Node B, and is an apparatus configured to control the radio base station Node B and the mobile station UE.

In general, data communications often cause burst traffic compared with voice communications or TV communications. Therefore, it is preferable that a transmission rate of a channel used for the data communications is changed fast.

However, as shown in FIG. 1, the radio network controller RNC integrally controls a plurality of radio base stations Node B in general. Therefore, in the conventional mobile communication system, there has been a problem that it is difficult to perform fast control for changing of the transmission rate of channel (for example, per approximately 1 through 100 ms), due to processing load, processing delay, or the like.

In addition, in the conventional radio network controller RNC, there has been also a problem that costs for implementing an apparatus and for operating a network are substantially increased even if the fast control for changing of the transmission rate of the channel can be performed.

Therefore, in the conventional mobile communication system, control for changing of the transmission rate of the channel is generally performed on the order from a few hundred ms to a few seconds.

Accordingly, in the conventional mobile communication system, when burst data transmission is performed as shown in FIG. 2A, the data are transmitted by accepting low-speed, high-delay, and low-transmission efficiency as shown in FIG. 2B, or, as shown in FIG. 2C, by reserving radio resources for high-speed communications to accept that radio bandwidth resources in an unoccupied state and hardware resources in the radio base station Node B are wasted.

It should be noted that both of the above-described radio bandwidth resources and hardware resources are applied to the vertical radio resources in FIGS. 2B and 2C.

Therefore, the 3rd Generation Partnership Project (3GPP) and the 3rd Generation Partnership Project 2 (3GPP2), which are international standardization organizations of the third generation mobile communication system, have discussed a method for controlling radio resources at high speed in a layer-1 and a media access control (MAC) sub-layer (a layer-2) between the radio base station Node B and the mobile station UE, so as to utilize the radio resources effectively. Such discussions or discussed functions will be hereinafter referred to as "Enhanced Uplink (EUL)".

As shown in a Non-Patent literature 1 (3GPP TSG-RAN TS25.309 v6.2.0), in a conventional mobile communication system using the "Enhanced Uplink", the radio base station Node B is configured to transmit an "Absolute Grant Channel (AGCH)" which includes an absolute value for the transmission rate of uplink user data (an "Enhanced Dedicated Physical Data Channel (E-DPDCH)") to each mobile station UE, so as to control the transmission rate of the uplink user data (i.e. the transmission rate of the E-DPDCH for transmitting uplink user data).

Each mobile station UE is configured to determine the transmission rate of the uplink user data (E-DPDCH) based on the absolute value included in the received AGCH.

Generally, if not otherwise specified, a radio base station means a cell in the radio base station, in the field of the Enhanced Uplink (EUL). In the field of the Enhanced Uplink (EUL), each mobile station UE is received the AGCH from a sieving cell of the mobile station UE.

Furthermore, generally, if not otherwise specified, a transmission rate includes a transport block size and a transmission power ratio (a ratio of an E-DPDCH transmission power to a DPCCH transmission power), in the field of the Enhanced Uplink (EUL). In addition, the AGCH includes a Radio Network Temporary Identity (RNTI).

Each mobile station UE is configured to determine whether or not the received AGCH is addressed for itself, using the Radio Network Temporary Identity (RNTI) included in the AGCH.

Further, as shown in a Non-Patent literature 2 (3GPP TSG-RAN R2-050438), there is a technique which enables a cell common transmission rate control which is common between cells and a mobile station individual transmission rate control which is individualized per mobile station UE, by having the plurality of Radio Network Temporary Identity (RNTI) at one mobile station UE.

Generally, in the mobile communication system using the "Enhanced Uplink", it is required to set an effective period to the AGCH. However, the length of the effective period required by the cell common transmission rate control and the mobile station individual transmission rate control is different.

Generally, in the field of the Enhanced Uplink (EUL), the effective period can be set by using a elapse time since the AGCH is received (for example, 10 ms, 5 TTI (Transmission Time interval) or the like).

In the field of the Enhanced Uplink (EUL), the effective period can be seen to set per HARQ process, as each HARQ process corresponds to a time interval or TTI (Transmission Time Interval). In the example of FIG. 14, the HARQ processes #4 to #8 are set as the effective period of the AGCH.

The effective period to the AGCH, which includes a Radio Network Temporary Identity (RNTI) for the cell common transmission rate control, is short.

Therefore, there has been a problem that when the specific one effective period to the AGCH is determined for both of the cell common transmission rate control and the mobile station individual transmission rate control, it is required to transmit the AGCH at frequent intervals, and the radio capacity in the downlink is decreased.

In addition, the effective period to the AGCH, which includes a Radio Network Temporary Identity (RTNI) for the mobile station individual transmission rate control, is long.

Therefore, there has been a problem that when the specific one effective period to the AGCH is determined for both of the cell common transmission rate control and the mobile station individual transmission rate control, it is not possible to allocate the transmission to each mobile station UE in fast, the scheduling becomes low speed, and the transmitting efficiency (throughput) in uplink is decreased.

BRIEF SUMMARY OF THE INVENTION

The present invention has been made considering the problems, and its object is to provide a transmission rate control method, a mobile station and a radio base station, which can set optimal effective period to an Absolute Grant Channel per a Radio Network Temporary Identity (RNTI) for the cell common transmission rate control and a Radio Network Temporary Identity (RNTI) for an mobile station individual transmission rate control, increase a transmitting efficiency in uplink, and increase radio capacity in downlink.

A first aspect of the present invention is summarized as a transmission rate control method for controlling a transmission rate of uplink user data, including: notifying, at a radio network controller, to a radio base station and a mobile station, an effective period to an Absolute Grant Channel which includes an absolute value for the transmission rate of the uplink user data; transmitting, at the radio network controller, the Absolute Grant Channel per Radio Network Temporary Identity, based on the notified effective period; and determining, at the mobile station, the transmission rate of the uplink user data based on the notified effective period, when receiving the Absolute Grant Channel per Radio Network Temporary Identity from the radio base station.

In the first aspect, the radio network controller can notify, to a radio base station and a mobile station, the effective period per Radio Network Temporary Identity.

A second aspect of the present invention is summarized as mobile station for transmitting uplink user data, including: an effective period receiver configured to receive an effective period to an Absolute Grant Channel which includes an absolute value for a transmission rate of the uplink user data; and a transmission rate determiner configured to determine the transmission rate of the uplink user data based on the received effective period, when receiving the Absolute Grant Channel per Radio Network Temporary Identity from a radio base station.

In the second aspect, the effective period receiver can be configured to receive the effective period per Radio Network Temporary Identity.

A third aspect of the present invention is summarized as a radio base station used in a transmission rate control method for controlling a transmission rate of uplink user data, including: an effective period receiver configured to receive an effective period to an Absolute Grant Channel which includes an absolute value for the transmission rate of the uplink user data; and an absolute rate control channel transmitter configured to transmit the Absolute Grant Channel per Radio Network Temporary Identity based on the received effective period.

In the third aspect, the effective period receiver can be configured to receive the effective period per Radio Network Temporary Identity.

BRIEF DESCRIPTION OF THE SEVERAL VIEWS OF THE DRAWINGS

FIG. 1 is diagram of an entire configuration of a general mobile communication system.

FIGS. 2A to 2C are graphs illustrating operations at the time of burst data transmission in a conventional mobile communication system.

FIG. 3 is a functional block diagram of a mobile station in the mobile communication system according to an embodiment of the present invention.

FIG. 4 is a functional block diagram of a baseband signal processing section of the mobile station in the mobile communication system according to the embodiment of the present invention.

FIG. 5 is a functional block diagram of a MAC-e processing section of the baseband signal processing section in the mobile station of the mobile communication system according to the embodiment of the present invention.

FIG. 8 is a functional block diagram of a MAC-e and layer-1 processing section (configured for an uplink) in the baseband signal processing section in the radio base station of the communication system according to the embodiment of the present invention.

FIG. 9 is a functional block diagram of the MAC-e functional section of the MAC-e and layer-1 processing section (configured for the uplink) in the baseband signal processing section in the radio base station of the mobile communication system according to the embodiment of the present invention.

FIG. 10 is a functional block diagram of a radio network controller of the mobile communication system according to the embodiment of the present invention.

FIG. 11 is a sequence diagram showing operations of the mobile communication system according to the embodiment of the present invention.

FIG. 14 is a diagram showing an example of HARQ processes to which an effective period is set in a general mobile communication system of applying the EUL.

Figure 6:
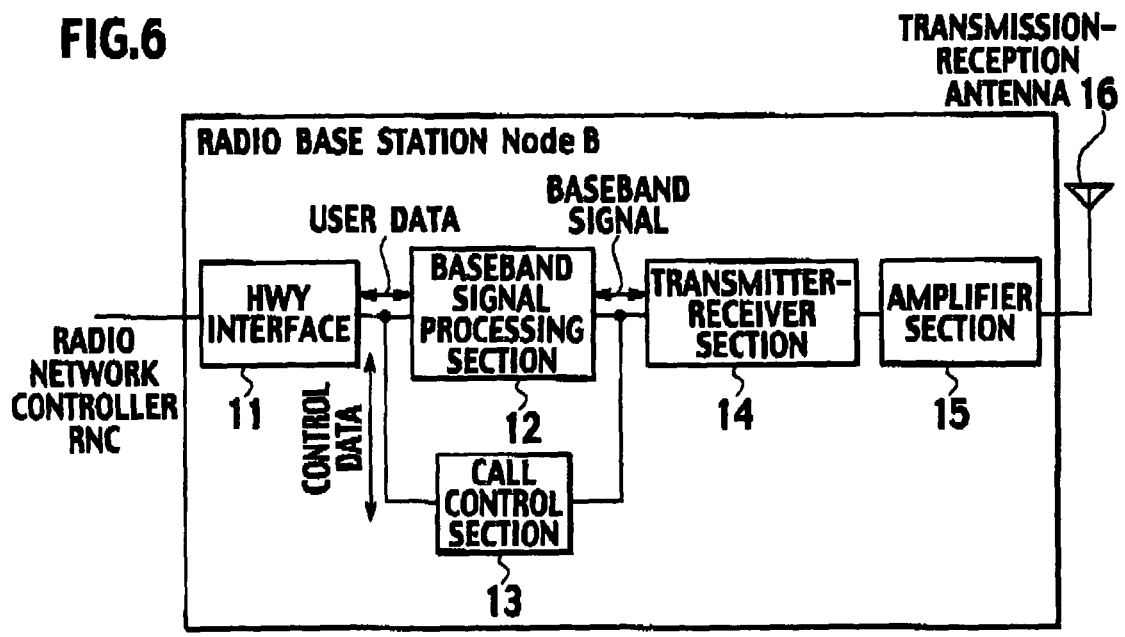
FIG. 6 is a functional block diagram of a radio base station of the mobile communication system according to the embodiment of the present invention.

DETAILED DESCRIPTION OF THE INVENTION (Configuration of Mobile Communication System According to First Embodiment of the Present Invention)

Referring to FIGS. 3 to 10, a configuration of a mobile communication system according to a first embodiment of the present invention will be described.

It should be noted that, as shown in FIG. 1, the mobile communication system according to this embodiment is provided with a plurality of radio base stations Node B #1 to Node B #5 and a radio network controller RNC.

The mobile communication system according to this embodiment, a "High Speed Downlink Packet Access (HSDPA)" is used in a downlink, and an "Enhanced Uplink (EUL)" is used in an uplink.

It should be noted that in both of the HSDPA and the EUL, retransmission control (N process stop and wait) shall be performed by a "Hybrid Automatic Repeat Request (HARQ)".

Therefore, in an uplink, an "Enhanced Dedicated Physical Channel (E-DPCH)" configured of an "Enhanced Dedicated Physical Data Channel (E-DPDCH)" and an "Enhanced Dedicated Physical Control Channel (E-DPCCH)", and a "Dedicated Physical Channel (DPCH)" configured of a "Dedicated Physical Date Channel (DPDCH)" and a "Dedicated Physical Control Channel (DPCCH)" are used.

Here, the E-DPCCH transmits control data for the EUL such as a transmission format number for defining a transmission format (transmission block size, or the like) of the EDPDCH, HARQ related information (the number of retransmission, or the like), and scheduling related information (transmission power, buffer residence-volume, or the like in the mobile station UE).

In addition, the E-DPDCH is paired with the E-DPCCH, and transmits user data for the mobile station UE based on the control data for the EUL transmitted through the E-DPCCH.

The DPCCH transmits control data such as a pilot symbol that is used for RAKE combining, SIR measurement, or the like, a Transport Format Combination Indicator (TFCI) for identifying a transmission format of uplink DPDCH, and a downlink power control bit in a downlink.

In addition, the DPDCH is paired with the DPCCH, and transmits user data for the mobile station UE based on the control data transmitted through the DPCCH. However, if user data that should be transmitted does not exist in the mobile station UE, the DPDCH can be configured not to be transmitted.

In addition, in the uplink, a "High Speed Dedicated Physical Control Channel (HS-DPCCH)" which are needed when the HSPDA is applied, and a "Random Access Channel (RACH)", are also used.

The HS-DPCCH transmits a Channel Quality Indicator (CQI) in a downlink and an acknowledge signal (Ack or Nack) for the HS-DPCCH.

As shown in FIG. 3, the mobile station UE according to this embodiment is provided with a bus interface 31, a call processing section 32, a baseband processing section 33, a radio frequency (RF) section 34, and a transmission-reception antenna 35.

However, these functions can be independently present as hardware, and can be partly or entirely integrated, or can be configured through a process of software.

The bus interface 31 is configured to forward the user data output from the call processing section 32 to another functional section (for example, an application related functional section). In addition, the bus interface 31 is configured to forward the user data transmitted from another functional section (for example, the application related functional section) to the call processing section 32.

The call processing section 32 is configured to perform a call control processing for transmitting and receiving the user data.

The baseband signal processing section 33 is configured to transmit the user data to the call processing section 32, the user data acquired by performing, against the baseband signals transmitted from the RF section 34, a layer-1 processing including a despreading processing, a RAKE combining processing, and a "Forward Error Correction (FEC)" decode processing, a "Media Access Control (MAC)" processing including a MAC-e processing and a MAC-d processing, and a "Radio Link Control (RLC)" processing.

In addition, the baseband signal processing section 33 is configured to generate the baseband signals by performing the RLC processing, the MAC processing, or the layer-1 processing against the user data transmitted from the call processing section 32 so as to transmit the baseband signals to the RF section 34.

Detailed description of the functions of the baseband signal processing section 33 will be given later.

The RF section 34 is configured to generate baseband signals by performing the detection processing, the filtering processing, the quantization processing, or the like against radio frequency signals received through the transmission-reception antenna 35, so as to transmit the generated baseband signals to the baseband signal processing section 33.

In addition, the RF section 34 is configured to convert the baseband signals transmitted from the baseband signal processing section 33 to the radio frequency signals.

As shown in FIG. 4, the baseband signal processing section 33 is provided with a RLC processing section 33a, a MAC-d processing section 33b, a MAC-e processing section 33c, and a layer-1 processing section 33d.

The RLC processing section 33a is configured to transmit, to the MAC-d processing section 33b, the user data transmitted from the call processing section 32 by performing a processing (RLC processing) in an upper layer of a layer-2 against the user data.

The MAC-d processing section 33b is configured to grant a channel identifier header, and to create a transmission format in the uplink based on the limitation of transmission power.

As shown in FIG. 5, the MAC-e processing section 33c is provided with an Enhanced Transport Format Combination (E-TFC) selecting section 33c1 and an HARQ processing section 33c2.

The E-TFC selecting section 33c1 is configured to determine a transmission format (E-TFC) of the E-DPDCH and the E-DPCCH, based on scheduling signals (the AGCH, or the like) transmitted from the radio base station Node B.

In addition, the E-TFC selecting section 33c1 is configured to receive the effective period to the AGCH per Radio Network Temporary Identity (RNTI), which is notified from the radio network controller RNC, when the channel connection setup for user data, or the like, is performed.

In addition, the E-TFC selecting section 33c1 is configured to determine the transmission rate of the uplink user data (the "Enhanced Dedicated Physical Data Channel (E-DPDCH)") based on the effective period which is included in the AGCH, when receiving the AGCH per Radio Network Temporary Identity (RNTI) from the radio base station Node B.

In addition, the E-TFC selecting section 33c1 is configured to transmit transmission format information on the determined transmission format (that is, a transmission data block size, an transmission power ratio between the E-DPDCH and the DPCCH, or the like) to the layer-1 processing section 33d, and also to transmit the determined transmission data block size or the transmission power ratio to the HARQ processing section 33c2.

Such a scheduling signal is information that is signaled in the cell where the mobile station UE is located, and includes control information for all the mobile stations located in the cell, or a specific group of the mobile stations located in the cell.

The HARQ processing section 33c2 is configured to perform process control for the "N-process stop-and-wait", so as to transmit the user data in the uplink based on an acknowledge signal (Ack/Nack for uplink data) transmitted from the radio base station Node B.

Specifically, the HARQ 33c2 is configured to determine whether or not the receive processing of downlink user data has been successful based on the result of the "Cyclic Redundancy Check (CRC)" entered from the first layer processing section 33d.

Then, the HARQ processing section 33c2 is configured to generate an acknowledge signal (Ack/Nack for downlink user data) based on the determined result, so as to transmit the acknowledge signal to the layer-1 processing section 33d.

In addition, the HARQ processing section 33c2 is configured to transmit, to the MAC-d processing 33b, the downlink user data entered from the layer-1 processing section 33d when the above-described determination result has been successful.

As shown in FIG. 6, the radio base station Node B according to this embodiment is provided with an HWY interface 11, a baseband signal processing section 12, a call control section 13, at least one transmitter-receiver section 14, at least one amplifier section 15, and at least one transmission-reception antenna 16.

The HWY interface 11 is an interface with a radio network controller RNC. Specifically, the HWY interface 11 is configured to receive user data transmitted from the radio network controller RNC to a mobile station UE via a downlink, so as to enter the user data to the baseband signal processing section 12.

In addition, the HWY interface 11 is configured to receive control data for the radio base station Node B from the radio network controller RNC, so as to enter the received control data to the call control section 13.

In addition, the HWY interface 11 is configured to acquire, from the baseband signal processing section 12, the user data Included in the uplink signals which are received from a mobile station UE via an uplink, so as to transmit the acquired user data to the radio network controller RNC.

Further, the HWY interface 11 is configured to acquire the control data for the radio network controller RNC from the call control section 13, so as to transmit the acquired control data to the radio network controller RNC.

The baseband signal processing section 12 is configured to generate baseband signals by performing the RLC processing, the MAC processing (the MAC-d processing and the MAC-e processing), or the layer-1 processing against the user data acquired from the HWY interface 11, so as to forward the generated baseband signals to the transmitter-receiver section 14.

Here, the MAC processing in the downlink includes an HARQ processing, a scheduling processing, a transmission rate control processing, or the like.

In addition, the layer-1 processing in the downlink includes a channel coding processing of user data, a spreading processing, or the like.

In addition, the baseband signal processing section 12 is configured to extract user data by performing the layer-1 processing, the MAC processing (the MAC-e processing and the MAC-d processing), or the RLC processing against the baseband signals acquired from the transmitter-receiver section 14, so as to forward the extracted user data to the HWY interface 11.

Here, the MAC-e processing in the uplink includes the HARQ processing, the scheduling processing, the transmission rate control processing, a header disposal processing, or the like.

In addition, the layer-1 processing in the uplink includes the despreading processing, the RAKE combining processing, the error correction decode processing, or the like.

Detailed description of the functions of the baseband signal processing section 12 will be given later.

In addition, the call control section 13 is configured to perform call control processing based on the control data acquired from the HWY interface 11.

The transmitter-receiver section 14 is configured to perform processing of converting baseband signals, which are acquired from the baseband signal processing section 12, to radio frequency signals (downlink signals), so as to transmit the radio frequency signals to the amplifier section 15.

In addition, the transmitter-receiver 14 is configured to perform processing of converting the radio frequency signals (uplink signals), which are acquired from the amplifier section 15, to the baseband signals, so as to transmit the baseband signals to the baseband signal processing section 12.

The amplifier section 15 is configured to amplify the downlink signals acquired from the transmitter-receiver section 14, so as to transmit the amplified downlink signals to the mobile station UE via the transmission-reception antenna 16.

In addition, the amplifier 15 is configured to amplify the uplink signals received by the transmission-reception antenna 16, so as to transmit the amplified uplink signals to the transmitter-receiver section 14.

Figure 7:
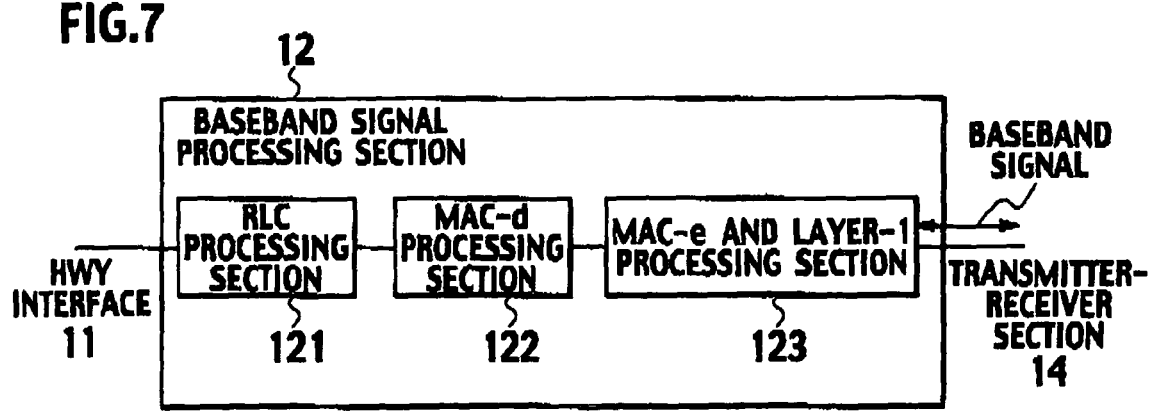
FIG. 7 is a functional block diagram of a baseband processing section in the radio base station of the mobile communication system according to the embodiment of the present invention.

As shown in FIG. 7, the baseband signal processing section 12 is provided with a RLC processing section 121, a MAC-d processing section 122, and a MAC-e and first layer processing section 123.

The MAC-e and layer-1 processing section 123 is configured to perform, against the baseband signals acquired from the transmitter-receiver section 14, the despreading processing, the RAKE combining processing, the error correction decode processing, the HARQ processing, or the like.

The MAC-d processing section 122 is configured to perform a header disposal processing against output signals from the MAC-e and layer-1 processing section 123.

The RLC processing section 121 is configured to perform, against the output signals from the MAC-d processing section 122, the retransmission control processing in the RLC layer or the reestablishment processing of RLC-Service Data Section (SDU).

However, these functions are not clearly divided per hardware, and can be obtained by software.

As shown in FIG. 8, the MAC-e and layer-1 processing section (configuration for the uplink) 123 is provided with a DPCCH RAKE section 123a, a DPDCH RAKE section 123b, an E-DPCCH RAKE section 123c, an E-DPDCH RAKE section 123d, an HS-DPCCH RAKE section 123e, a RACH processing section 123f, a Transport Format Combination Indicator (TFCI) decoder section 123g, buffers 123h and 123m, re-despreading sections 123i and 123n, FEC decoder sections 123j and 123p, an E-DPCCH decoder section 123k, a MAC-e functional section 123l, an HARQ buffer 123o, a MAC-hs functional section 123q, and an interference power measurement section 123r.

The E-DPCCH RAKE section 123c is configured to perform, against the E-DPCCH in the baseband signals transmitted from the transmitter-receiver section 14, the despreading processing and the RAKE combining processing using a pilot symbol included in the DPCCH.

The E-DPCCH decoder section 123k is configured to acquire transmission format number related information, HARQ related information, scheduling related information, or the like, by performing the decode processing against the RAKE combining outputs of the E-DPCCH RAKE section 123c, so as to enter the information to the MAC-e functional section 123l.

The E-DPDCH RAKE section 123d is configured to perform, against the E-DPDCH in the baseband signals transmitted from the transmitter-receiver section 14, the despreading processing using the transmission format information (the number of codes) transmitted from the MAC-e functional section 123l and the RAKE combining processing using the pilot symbol included in the DPCCH.

The buffer 123m is configured to store the RAKE combining outputs of the E-DPDCH RAKE section 123d based on the transmission format information (the number of symbols) transmitted from the MAC-e functional section 123l.

The re-despreading section 123n is configured to perform the despreading processing against the RAKE combining outputs of the E-DPDCH RAKE section 123d, based on the transmission format information (spreading factor) transmitted from the MAC-e functional section 123l.

The HARQ buffer 123o is configured to store the despreading processing outputs of the re-despreading section 123n, based on the transmission format information transmitted from the MAC-e functional section 123l.

The FEC decoder section 123p is configured to perform an error correction decoding processing (the FEC decode processing) against the despreading processing outputs of the re-despreading section 123n, which is stored in the HARQ buffer 123o, based on the transmission format information (transmission data block size) transmitted from the MAC-e functional section 123l.

The MAC-e functional section 123l is configured to calculate and output the transmission format information (the number of codes, the number of symbols, spreading factor, transmission data block size, and the like) based on the transmission format number related information, the HARQ related information, the scheduling related information, and the like, which are acquired from the E-DPCCH decoder section 123k.

In addition, as shown in FIG. 9, the MAC-e functional section 123l is provided with a receive processing command section 123/1, an HARQ controlling section 123/2, and a scheduling section 123/3.

The receive processing command section 123/1 is configured to transmit the transmission format number related information, the HARQ related information, and the scheduling related information, which are entered from the E-DPCCH decoder section 123k, to the HARQ controlling section 123/2.

In addition, the receive processing command section 123/1 is configured to transmit, to the scheduling section 123/3, the scheduling related information entered from the E-DPCCH decoder 123k.

Further, the receive processing command section 123/1 is configured to output the transmission format information corresponding to the transmission format number entered from the E-DPCCH decoder section 123k.

The HARQ controlling section 123/2 is configured to determine whether or not the receive processing of uplink user data has been successful, based on the result of CRC entered from the FEC decoder section 123p.

Then, the HARQ controlling section 123/2 is configured to generate an acknowledge signal (Ack or Nack), based on the determination result, so as to transmit the generated acknowledge signal to the configuration for the downlink of the baseband signal processing section 12.

In addition, the HARQ controlling section 123/2 is configured to transmit the uplink user data entered from the FEC decoder section 123p to the radio network controller RNC, when the above determination result has been successful.

In addition, the HARQ controlling section 123/2 is configured to clear soft decision values stored in the HARQ buffer 123o, when the above determination result has been successful.

On the other hand, the HARQ controlling section 123/2 is configured to store, in the HARQ buffer 123o, the uplink user data, when the above determination result has not been successful.

In addition, the HARQ controlling section 123/2 is configured to forward the above determination result to the receive processing command section 123/1.

The receive processing control command section 123/1 is configured to notify the E-DPDCH RAKE section 123d and the buffer 123m of an hardware resource that should be prepared for the following transmission time interval (TTI), so as to perform notification for reserving the resource in the HARQ buffer 123o.

In addition, when the uplink user data is stored in the buffer 123m, the receive processing command section 123/1 is configured to designate the HARQ buffer 123o and the FEC decoder section 123p to perform the FEC decoding processing after adding the uplink user data, which is stored in the HARQ buffer 123o, in a process corresponding to the TTI and a newly received uplink user data, per TTI.

The scheduling section 123/3 is configured to transmit the scheduling signals (the AGCH, or the like) via the configuration for the downlink.

Specifically, the scheduling section 123/3 is configured to receive the effective period to the AGCH per Radio Network Temporary Identity (RNTI), which is notified from the radio network controller RNC, when the channel connection setup for user data, or the like, to performed.

In addition, the scheduling section 123/3 is configured to transmit the AGCH, which includes an absolute value for transmission rate of uplink user data, per Radio Network Temporary Identity (RNTI), based on the effective period.

The radio network controller RNC according to this embodiment is an apparatus located in an upper level of the radio base station Node B, and is configured to control radio communications between the radio base station Node B and the mobile station UE.

As shown in FIG. 10, the radio network controller RNC according to this embodiment is provided with an exchange interface 51, a Logical Link Control (LLC) layer processing section 52, a MAC layer processing section 53, a media signal processing section 54, a radio base station interface 55, and a call control section 56.

The exchange interface 51 is an interface with an exchange 1, and is configured to forward the downlink signals transmitted from the exchange 1 to the LLC layer processing section 52, and to forward the uplink signals transmitted from the LLC layer processing section 52 to the exchange 1.

The LLC layer processing section 52 is configured to perform an LLC sub-layer processing such as a synthesis processing of a header such as a sequence number or a trailer.

The LLC layer processing section 52 is also configured to transmit the uplink signals to the exchange interface 51 and to transmit the downlink signals to the MAC layer processing section 53, after the LLC sub-layer processing is performed.

The MAC layer processing section 53 is configured to perform a MAC layer processing such as a priority control processing or a header granting processing.

The MAC layer processing section 53 is also configured to transmit the uplink signals to the LLC layer processing section 52 and to transmit the downlink signals to the radio base station interface 55 (or a media signal processing section 54), after the MAC layer processing is performed.

The media signal processing section 54 is configured to perform a media signal processing against voice signals or real time image signals.

The media signal processing section 54 is also configured to transmit the uplink signals to the MAC layer processing section 53 and to transmit the downlink signals to the radio base station interface 55, after the media signal processing is performed.

The radio base station interface 55 is an interface with the radio base station Node B. The radio base station interface 55 is configured to forward the uplink signals transmitted from the radio bass station Node B to the MAC layer processing section 53 (or the media signal processing section 54) and to forward the downlink signals transmitted from the MAC layer processing section 53 (or the media signal processing section 54) to the radio base station Node B.

The call control section 56 is configured to perform a radio resource control processing for controlling radio resources such as call admission control processing, handover processing, and the like, a channel setup by the layer-3 signaling, and open processing, or the like.

The call control section 56 is configured to notify the effective period to the AGCH per Radio Network Temporary Identity (RNTI) to the radio base station Node B and the radio network controller RNC, when the channel connection setup for user data, or the like, is performed.

(Operations of Mobile Communication System According to First Embodiment of the Present Invention)

Referring to FIG. 11, operations of the mobile communication system according to the embodiment of the present invention will be described. Here, FIG. 11 shows the example when the mobile station UE is calling. However, the present invention can also be applied to the example when the mobile station UE is called.

As shown in FIG. 11, in step S1001, the mobile station UE calls to the radio network controller RNC, in order to request a start of communication (a channel connection setup for user data) using the Enhanced Dedicated Physical Channel (E-DPCH).

In step S1002, the radio network controller RNC requests a connection setup using the Enhanced Dedicated Physical Channel (E-DPDCH) to the radio bass station Node B which controls the mobile station UE.

In step S1003, when the E-DPDCH connection setup is completed, the radio base station Node B transmits a connection setup response for notifying the fact, to the radio network controller RNC.

In step S1004, the radio network controller RNC transmits a control channel connection setup response to the mobile station UE.

Here, the control channel connection setup response is used to setup a control channel connection for communicating information such as a type of user data, a resource number and transmittable/receivable transmission rate of a mobile station UE, or the like.

In step S1005, when the control channel connection setup is completed, the mobile station UE transmits a control channel connection setup response for notifying the fact, to the radio network controller RNC.

In step S1006, various parameters for E-DPCH (for example, a transmission wave amplitude ratio in each transmission format, or the like) are communicated between the radio network controller RNC and the radio base station Node B, and a channel connection for user data is set.

In step S1007, various parameters for E-DPCH (for example, a transmission wave amplitude ratio in each transmission format, or the like) are communicated between the radio network controller RNC and the mobile station UE, and a channel connection for user data is set.

In step S1008, the communication between the radio network controller RNC and the mobile station UE is performed using the set channel connection for user data (for example, the E-DPDCH).

During the communication of the parameters in step S1006, the radio network controller RNC notifies an effective period to an AGCH per Radio Network Temporary Identity (RNTI) to the radio base station Node B.

Then, the radio base station Node B transmits the AGCH per Radio Network Temporary Identity (RNTI) based on the notified effective period.

Further, during the communication of the parameters in step S1007, the radio network controller RNC allocates one or plurality of Radio Network Temporary Identity (RNTI) to the mobile station UE, and at the same time, notifies the effective period to the AGCH per Radio Network Temporary Identity (RNTI).

Furthermore, the mobile station UE determines the transmission rate of uplink user data based on the effective period which is included in the AGCH, when receiving the AGCH per Radio Network Temporary Identity (RNTI) from the radio base station Node B.

Figure 12:
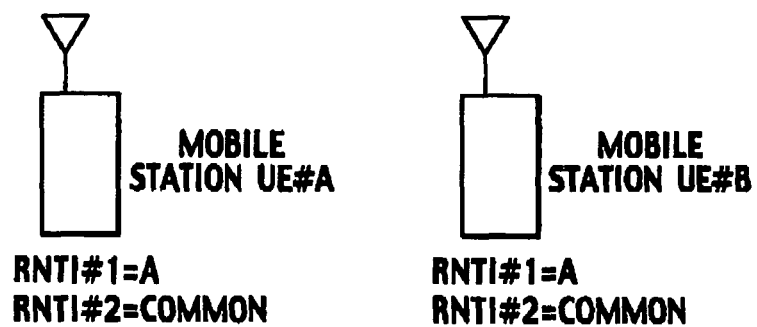
FIG. 12 is a diagram showing an example for allocating a Radio Network Temporary Identity of the mobile communication system according to the embodiment of the present invention.

FIG. 12 shows the aspect of allocating the Radio Network Temporary Identity (RNTI) to each mobile station UE#A to UE#B.

Here, the Radio Network Temporary Identity for mobile station individual transmission rate control "RNTI#1=A" and the Radio Network Temporary Identity for cell common transmission rate control "RNTI#2=COMMON" are allocated to the mobile station UE#A, and the Radio Network Temporary Identity for mobile station individual transmission rate control "RNTI#1=B" and the Radio Network Temporary Identity for cell common transmission rate control "RNTI#2=COMMON" are allocated to the mobile station UE#B.

Figure 13:
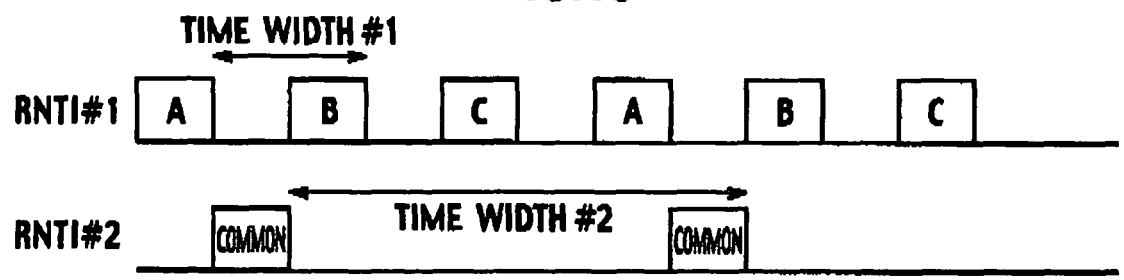
FIG. 13 is a diagram showing an example for transmission pattern of An Absolute Grant Channel of the mobile communication system according to the embodiment of the present invention.

FIG. 13 shows one example for transmission pattern of AGCH transmitted by the radio base station Node B.

As shown in FIG. 13, the effective period (time width #1) to the Radio Network Temporary Identity for mobile station individual transmission rate control "RNTI#1" becomes shorter.

Therefore, in the present invention, it is possible to increase the transmitting efficiency (throughput) in uplink by allocating the opportunity for the transmission to each mobile station UE at frequent intervals.

Furthermore, as shown in FIG. 13, the effective period (time width #2) to the Radio Network Temporary Identity for cell common transmission rate control "RNTI#2" becomes longer.

Therefore, in the present invention, it is possible to decrease the radio capacity in the downlink by decreasing the transmitting frequency.

(Effects of Mobile Communication System According to First Embodiment of the Present Invention)

The present invention can provide a transmission rate control method, a mobile station and a radio base station, which can set optimal effective period to an Absolute Grant Channel per a Radio Network Temporary Identity (RNTI) for a cell common transmission rate control which is common between cells and a Radio Network Temporary Identity (RNTI) for a mobile station individual transmission rate control which is individualized per mobile station UE, increase a transmitting efficiency in uplink, and increase radio capacity in downlink.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. A transmission rate control method for controlling a transmission rate of uplink user data, comprising:
   notifying, at a radio network controller, to a mobile station, an effective period of an absolute value of the transmission rate of the uplink user data transmitted via an absolute grant channel;
   determining, at the mobile station, the transmission rate of the uplink user data based on the notified effective period and the absolute value of the transmission rate of the uplink user data transmitted via an absolute grant channel per Radio Network Temporary Identity from a radio base station.

2. The transmission rate control method according to claim 1, wherein the radio network controller notifies, to a mobile station, the effective period per Radio Network Temporary Identity.

3. A mobile station for transmitting uplink user data, comprising:
   an effective period receiver configured to receive an effective period of an absolute value of the transmission rate of the uplink user data transmitted via an absolute grant channel; and
   a transmission rate determiner configured to determine the transmission rate of the uplink user data, based on the received effective period and the absolute value of the transmission rate of the uplink user data transmitted via an absolute grant channel per Radio Network Temporary Identity from a radio base station.

4. The mobile station according to claim 3, wherein the effective period receiver is configured to receive the effective period per Radio Network Temporary Identity.

5. A radio base station used in a transmission rate control method for controlling a transmission rate of uplink user data, comprising:
   an effective period receiver configured to receive an effective period of an absolute value of the transmission rate of the uplink user data transmitted via an absolute grant channel; and
   an absolute rate control channel transmitter configured to transmit the absolute grant channel per Radio Network Temporary Identity based on the received effective period.

6. The radio base station according to claim 5, wherein the effective period receiver is configured to receive the effective period per Radio Network Temporary Identity.

7. The transmission rate control method according to claim 1, wherein the effective period is notified in terms of a HARQ process.

8. The mobile station according to claim 3, wherein the effective period is notified in terms of a HARQ process.

9. The radio base station according to 5, wherein the effective period is notified in terms of a HARQ process.

* * * * *